Sept. 2, 1930.    G. DALL'OLIO CONTRI    1,774,788
MECHANICAL DAMPER
Filed Feb. 20, 1925    2 Sheets-Sheet 1

G. Dall'Olio Contri
inventor

By: Marks & Clerk
Attys

Sept. 2, 1930.  G. DALL OLIO CONTRI  1,774,788
MECHANICAL DAMPER
Filed Feb. 20, 1925   2 Sheets-Sheet 2
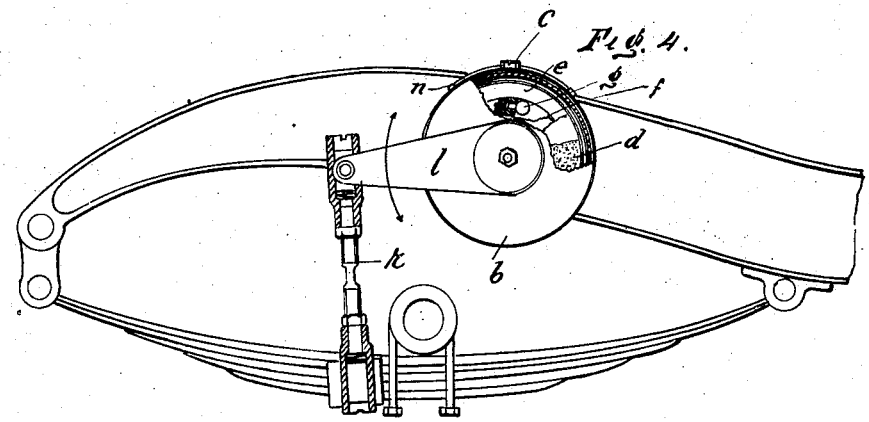
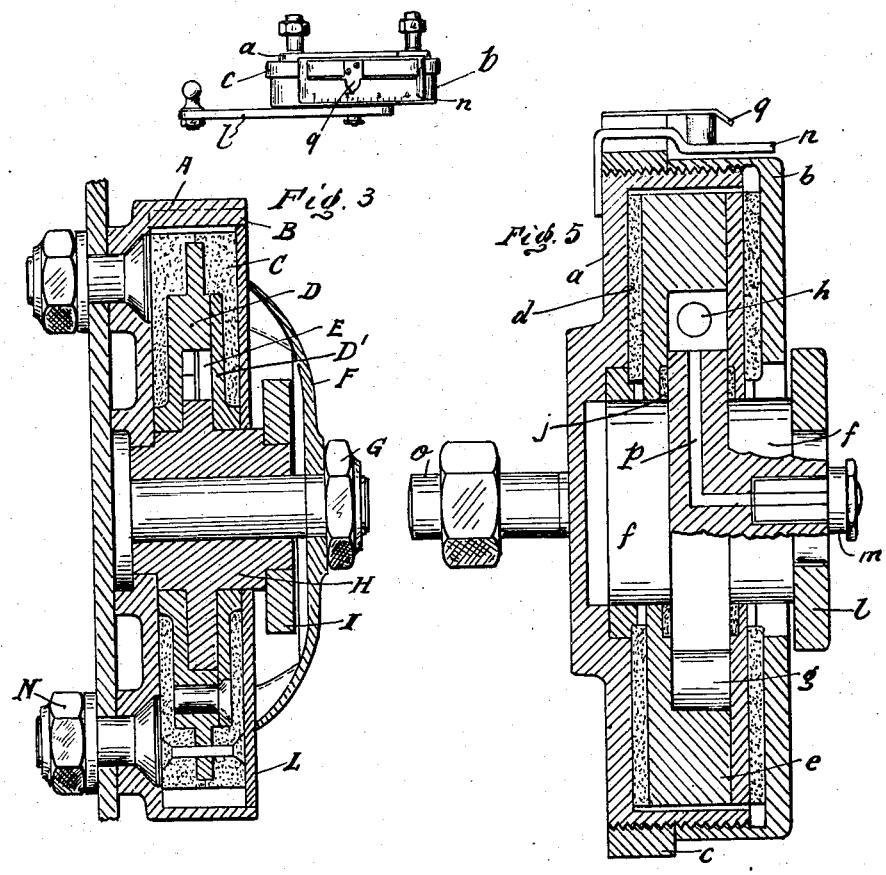
G. Dall'Olio Contri
inventor
By: Marks & Clerk
Attys Patented Sept. 2, 1930

1,774,788

UNITED STATES PATENT OFFICE

GIOVANNI DALL'OLIO CONTRI, OF MILAN, ITALY

MECHANICAL DAMPER

Application filed February 20, 1925, Serial No. 10,661, and in Italy February 20, 1924.

The object of this invention is to provide an apparatus which may be secured on the side sills or longitudinal beams of a vehicle and adapted for absorbing the oscillations which generally happen in the laminated or elliptical springs after the first bending caused by shocks and bumps to which the wheels of a vehicle are subjected during the run, the said effect being obtained by braking the return reaction of the laminated springs. The manner in which this result may be obtained consists in causing a movable disc to be subjected to the stresses of the laminated spring in such a manner that the disc is free to run in one sense, while by running in the other sense it will engage a body meeting with the resistance of a casing wherein the said body is enclosed and which is formed integral with the longitudinal bearer, the clutch between the movable part and the body meeting with resistance opposed to its revolution within the said case being obtained by means of suitable springs.

A further object of this invention is to provide the damper for graduating the braking action with a cover to be screwed on the case and adapted to compress the frictional matter wherein the disc is turning and to provide moreover felt packings for ensuring the oil tighting of the internal mechanical device.

In the annexed drawing an example of the maner in which the invention is to be carried out is shown.

Fig. 3 is a sectional view, and

Fig. 4 is a general part sectional view of an improved type.

Fig. 5 is a cross section, and

Fig. 6 a plan view thereof.

Figure 1:
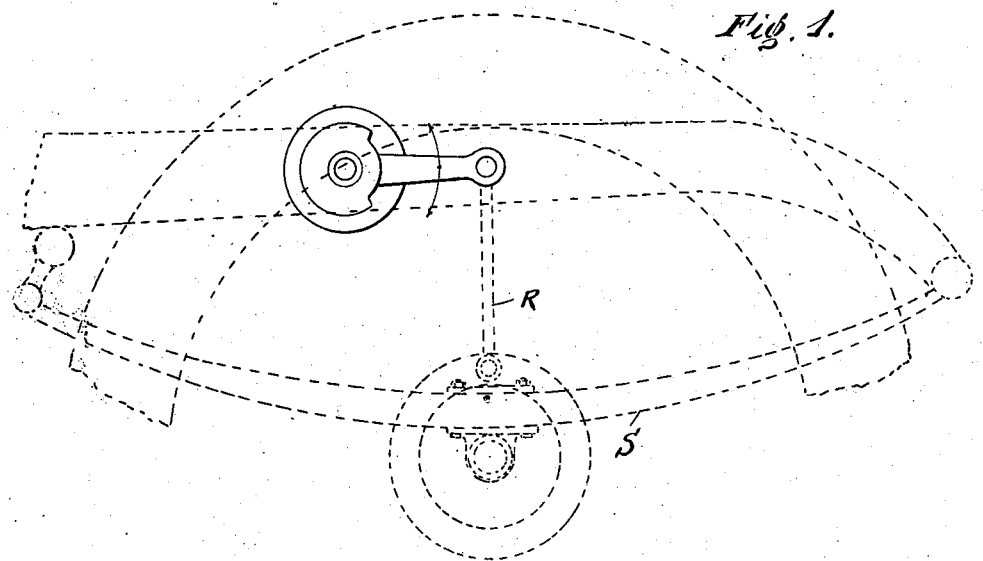
Figure 1 is a main view of the device applied to a side sill.
Figure 2:
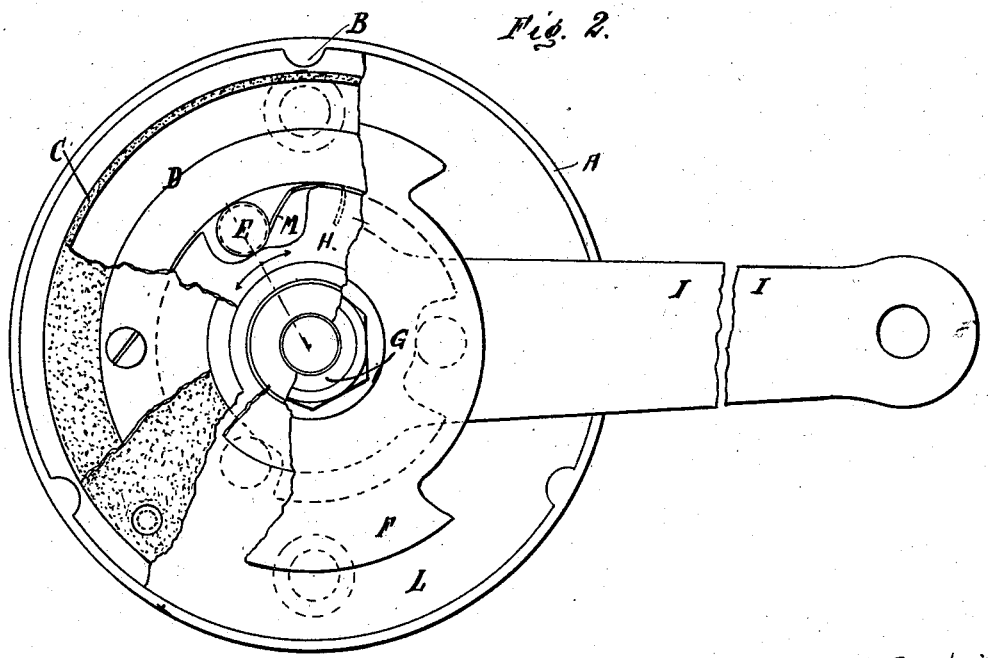
Fig. 2 is a part sectional view of the device only in an enlarged scale.

According to Figures 1, 2 and 3, A indicates a box which is fixed on the side sill by means of a bolt N and provided with three or more projections B. L is a disc held in place by the projections B and serving as a cover for the box A in such a manner that this latter may contain a friction developing means C formed of felt or like material. D indicates a recessed friction element or disk of metal merging into the frictional matter and H a central core which may be coupled with the disc by means of rolls E cooperating with springs M; the disc D preferably includes a removable part D′ permitting introduction of the core H and rolls E; I is a driving lever which is integral with the central core H; G is an adjustment nut screwed on the rotating pin of the core H and serving for locking more or less the pressure cap F of the cover L in order to render more or less compact the frictional matter C thus varying the frictional pressure of the disc D; the lever I through the tie-rod R rests upon the laminated spring S weighing down on the axle of the running wheel.

When the laminated vehicle springs is compressed, the lever I is moved upwardly, thus causing the core to be rotated in a counterclockwise direction, Fig. 2, the rolls E moving to inoperative position and permitting substantially unrestrained compression of the spring S.

On the contrary, when the laminated spring reacts and performs its return movement, the core in turning from the left to the right is coupled with the disc by means of the rolls E, and the disc by frictionally turning with the frictional matter brakes the return movement of the spring, the adjustment nut G serving to axially displace the cover L which is guided by the projections B which in the same time prevent the rotation thereof.

According to the modification shown in Figures 4, 5 and 6, —a— is the box secured on the side sill, the external crown whereof is formed with two opposed threads the one of which belonging to the cover —b— is adapted to compress the frictional matter —d— while the other one belonging to the ring —c— serves as a lock nut for the cover —b—.

—e— is the internal box containing the mechanism formed by the central core —f— which is operated by the lever —l— and the coupling rolls —g— guided by the spring pressed pin —h—; the said rolls are enclosed within cavities formed by the core and the box and being of decreasing cross section; —p— is the lubricating piping, —j— indicate felt packings for oil tighting, —m— is the oiler, —n— is a graduated plate whereon may be read the indications of a pointer —q— relative to the braking amount according to the higher or lower pressure of the cover —b—; —o— indicate stud bolts for securing the device on the longitudinal bearer.

The working of the device is the same as described before in connection with Figures 1-3 i. e. as follows: the connecting rod —r— connects the lever —l— to the spring to be braked: the compression under load of the latter does not produce braking as the core —f— is turning from the left to the right, in Fig. 4, and the rolls are not squeezed. On the return of the spring the core will turn from the right to the left and the rolls —g— being squeezed between —f— and —e— tend to carry this latter towards the resistance opposed by the cover —b— with the aid of the frictional matter —d—; in this manner a braking action of the spring will be obtained the amount whereof will depend precisely upon the degree of threading of the cover on the external box —a—.

It is to be understood that the particulars of structure and shape may vary in the practice with regard to those described and shown on the accompanying drawings without exceeding the boundaries of this invention.

Having now particularly described and ascertained the nature of my invention and in what manner the same is to be performed, I declare that what I claim is:

1. A shock absorber including a casing, a cover adjustable on said casing, a rotatable member journalled in said casing, a recessed friction element movable in said casing and accommodating a portion of the rotatable member, spring controlled clutching elements on the periphery of the portion of the rotatable member which is accommodated in the recess in the friction element and guided by the recessed friction element, and friction developing means on opposite sides of the friction element and coacting with the casing and cover.

2. A shock absorber including a casing, a stud arranged centrally therein, a member rotatable on the stud and provided with a disc like extension recessed at suitable intervals on the periphery, a two-part friction element movable in the casing including a sectional metallic member loosely mounted about the rotatable member and provided with a recess for accommodating the disc like extension of the rotatable member, friction developing means accommodated within the casing, spring pressed clutching rollers mounted in the recesses of the disc like extension and housed in the recess of the two-part metallic member and guided thereby, a cover for the casing and means for adjusting the relation of the cover with respect to the casing to consequently vary the frictional engagement between the casing and its cover and the friction developing means.

GIOVANNI DALL'OLIO CONTRI.